(12) United States Patent
Dekel et al.

(10) Patent No.: US 11,775,071 B1
(45) Date of Patent: Oct. 3, 2023

(54) HAPTIC FEEDBACK FROM A COMPUTING ACCESSORY

(71) Applicant: Microsoft Technology Licensing, LLC, Redmond, WA (US)

(72) Inventors: Shoham Dekel, Ness Ziona (IL); Assaf Bar-Ness, Ness Ziona (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/689,114

(22) Filed: Mar. 8, 2022

(51) Int. Cl.
*G06F 3/01* (2006.01)
*G06F 3/0346* (2013.01)

(52) U.S. Cl.
CPC ............ *G06F 3/016* (2013.01); *G06F 3/0346* (2013.01)

(58) Field of Classification Search
CPC ...... G06F 3/016; G06F 3/011; G06F 3/03545; G06F 2203/014; G06F 2203/013; A63F 13/285; G08B 6/00
See application file for complete search history.

(56) References Cited

U.S. PATENT DOCUMENTS

| | | | | |
|---|---|---|---|---|
| 8,253,686 | B2 * | 8/2012 | Kyung | G06F 3/03545 345/173 |
| 10,114,478 | B2 * | 10/2018 | Tsukahara | G06F 3/0346 |
| 10,216,280 | B2 | 2/2019 | Levesque et al. | |
| 10,725,564 | B2 | 7/2020 | Sundara-rajan et al. | |
| 10,852,868 | B2 | 12/2020 | Hauenstein et al. | |
| 11,209,931 | B2 | 12/2021 | Lynn et al. | |
| 11,308,772 | B2 * | 4/2022 | Nakamura | G08B 6/00 |
| 2006/0092133 | A1 * | 5/2006 | Touma | G06F 3/04815 345/158 |
| 2013/0207792 | A1 * | 8/2013 | Lim | G06F 3/011 340/407.1 |
| 2014/0059255 | A1 * | 2/2014 | Ito | G06F 3/016 710/18 |
| 2017/0185151 | A1 | 6/2017 | Pahud et al. | |
| 2019/0171302 | A1 | 6/2019 | Su et al. | |
| 2019/0278372 | A1 * | 9/2019 | Nakagawa | A63F 13/285 |
| 2020/0026354 | A1 | 1/2020 | Swindells | |
| 2020/0061459 | A1 | 2/2020 | Nakagawa et al. | |
| 2020/0192484 | A1 | 6/2020 | Lehmann et al. | |
| 2020/0214667 | A1 | 7/2020 | Shoudy et al. | |

(Continued)

FOREIGN PATENT DOCUMENTS

| | | | |
|---|---|---|---|
| KR | 20150052467 | A * | 5/2015 |
| NL | 2027963 | B1 | 10/2022 |

OTHER PUBLICATIONS

Campbell, Mikey, "Apple Invents Ring-Style Wearable Device with Voice Control, Haptics, Cameras and More", Retrieved From: https://appleinsider.com/articles/15/10/01/apple-invents-ring-style-wearable-device-with-voice-control-haptics-cameras-and-more, Oct. 1, 2015, 9 Pages.

(Continued)

*Primary Examiner* — Koosha Sharifi-Tafreshi
(74) *Attorney, Agent, or Firm* — Holzer Patel Drennan (57) ABSTRACT

A method of providing haptic feedback includes collecting 3D motion data at a handheld computing accessory; analyzing the collected 3D motion data to infer a grip characteristic indicating an aspect of a user grip on the handheld computing accessory; selecting an amplitude for a haptic feedback waveform based on the inferred grip characteristic; and generating, at the handheld computing accessory, haptic feedback according to the selected amplitude.

22 Claims, 6 Drawing Sheets

(56) References Cited

U.S. PATENT DOCUMENTS

2020/0371610 A1    11/2020    Bakken et al.
2022/0080304 A1*    3/2022    Yamano .................. G06F 3/041

OTHER PUBLICATIONS

Freeman, Euan, "Above-Device Tactile Feedback", Retrieved From: https://web.archive.org/web/20141121171615/http://euanfreeman.co.uk/projects/above-device-tactile-feedback/, Nov. 21, 2014, 3 Pages.

Hagen, Marc, "Introducing Tap Strap 2—the Plug & Play, All-In-One Wearable Keyboard, Mouse, & Air Gesture Controller", Retrieved From: https://www.closingthegap.com/introducing-tap-strap-2-the-plug-play-all-in-one-wearable-keyboard-mouse-air-gesture-controller/, Feb. 17, 2020, 13 Pages.

"International Search Report and Written Opinion Issued in PCT Application No. PCT/US22/051337", dated Mar. 13, 2023, 14 Pages.

Puerto, et al., "Influence of User Grasping Position on Haptic Rendering", In Journal of IEEE/ASME Transactions on Mechatronics, vol. 17, Issue 1, Feb. 2012, pp. 174-182.

* cited by examiner

Tail Grip
302

Mid-Device Grip
304

Tip Grip
306

HAPTIC FEEDBACK FROM A COMPUTING ACCESSORY

BACKGROUND

In traditional applications, a user moves a mouse in two dimensions against a flat surface and these movements are mirrored by a cursor presented on a two-dimensional display. Recently, some manufactures have launched products that serve the functionality of the traditional mouse but that operate "in-air" in the sense that the device is designed to be used without making contact with a two-dimensional surface. One example of an in-air electronic accessory is a hand-held mouse that can be moved in-air while pointed at a display, like a hand-held remote control, to affect motions of a cursor or other digital queue that moves about the screen.

SUMMARY

Implementations described and claimed herein provide a method that includes collecting three dimensional (3D) motion data at a handheld computing accessory; analyzing the collected 3D motion data to infer a grip characteristic indicating an aspect of a user grip on the handheld computing accessory; selecting an amplitude for a haptic feedback waveform based at least in part on the determined grip characteristic; and generating, at the hand-held computing accessory, haptic feedback according to the selected amplitude.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

In contrast with the traditional desktop mouse, in-air computing accessories may be designed to detect movement in three dimensions and/or to translate gestures that may include 3D components into 2D space of a display. For many users, the introduction of movements in the third dimension makes it less intuitive to effectively use an in-air accessory than a traditional mouse serving a similar purpose in 2D. For instance, since there is no flat surface to constrain movements to a flat plane, the user may inadvertently tilt the in-air accessory and influence detected x/y movement more than intended. Likewise, the ability to move in the third dimension (toward and away from screen) may skew the user's perception of how far the accessory has moved in the vertical and horizontal directions. Additionally, users may have difficulty controlling the device to keep the corresponding cursor (mouse) inside a particular window, such as a button that they wish to select.

Many existing devices provide haptic feedback in the form of vibrations or pulses that vary in intensity and duration. However, these devices often rely on inputs specific to the 2D experience and/or provide feedback that is specific to the 2D experience. For example, a stylus may rely on electrostatic inputs (specific to 2D/proximity sensing) and/or provide haptic feedback that varies in proportion to user-applied pressure to the accessory against a flat surface.

According to one implementation, the disclosed technology provides a haptic feedback system for an in-air computing accessory that provides haptic feedback to a user in response to events captured by 3D movement sensor(s) of the accessory. The haptic signals are uniquely designed to improve the user's sense of position control while navigating the accessory through 3D space. For example, the disclosed technology may allow a user to "feel" certain movements of the cursor element controlled by the in-air computing accessory, as opposed to merely watching the cursor element move on a display. For example, characteristics of a haptic feedback waveform may be selectively varied to alert the user to directional changes in movement, increases/decreases in velocity, and/or changes in acceleration.

In another implementation, the disclosed system alters a haptic feedback waveform based at least in part on one or more characteristics of a user grip that are inferred through an analysis of 3D motion data. For example, the haptic feedback system may detect characteristics of user grip and dynamically adjusts the strength of haptic feedback based at least in part on the grip type to ensure that the user's haptic experience remains uniform regardless of grip. While grip type may, in some implementations, be detected using proximity sensing (e.g., capacitive sensor(s)), an alternative technique disclosed herein facilitates identification of grip type utilizing data from 3D motion data. Still other implementations provide for varying haptic feedback in a variety of ways that improve the user's sense of control over the accessory's movements in 3D space. As used herein, "based at least in part on" implies a conditional reliance that may include other dependencies in addition to those explicitly stated.

Figure 1:
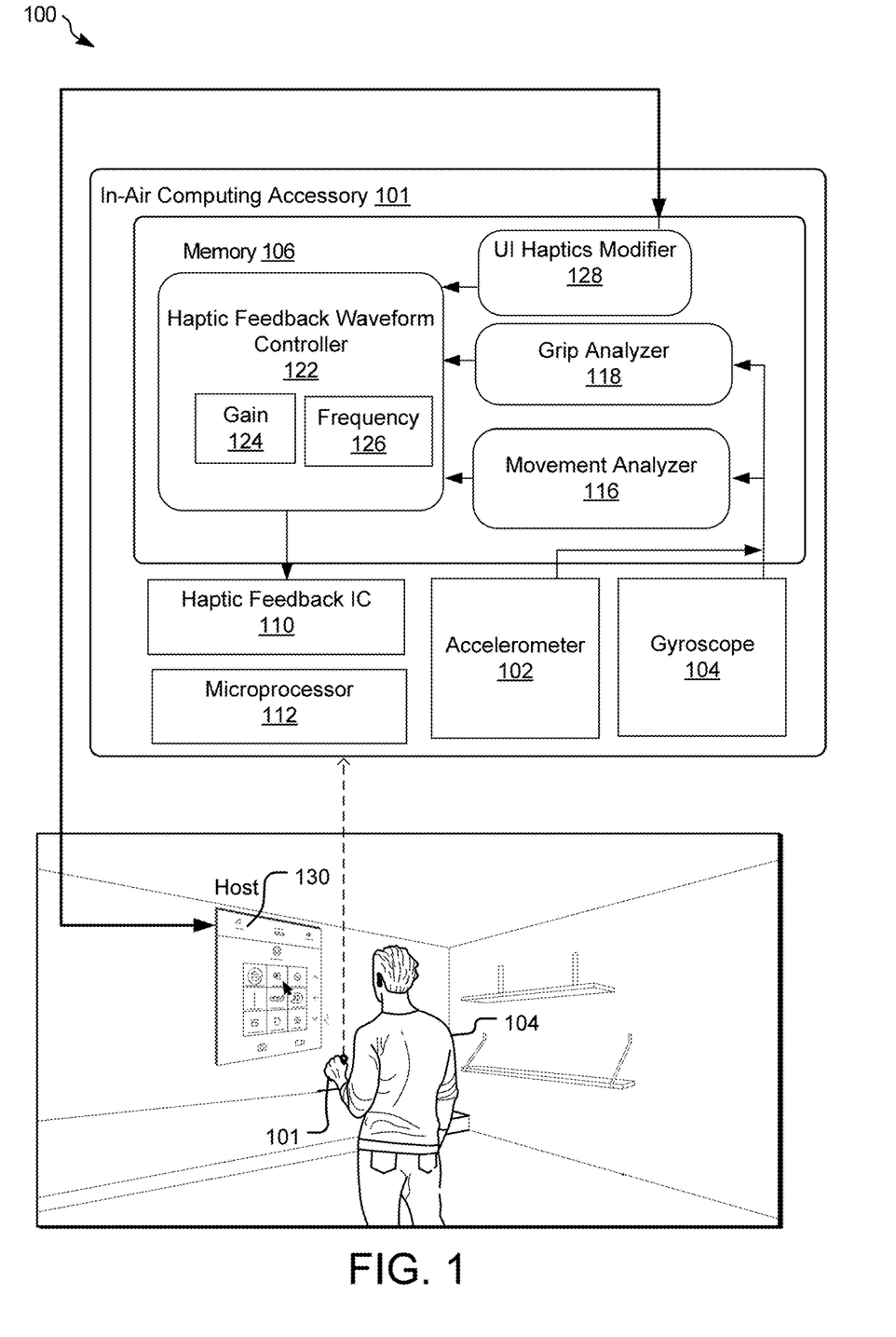
FIG. 1 illustrates an example in-air computing accessory that provides haptic feedback based at least in part on sensed 3D motion data.

FIG. 1 illustrates an example computing system 100 with an in-air computing accessory 101 that provides haptic feedback to a user based at least in part on sensed 3D motion data. The in-air computing accessory 101 is, in general, a device that is used "in-the-air" to control a graphic element (e.g., a mouse cursor) on a display. As used herein, "in-the-air" implies that the device is not pressed against a 2D surface when in normal use. The in-air computing accessory 101 may, in various implementations, assume a variety of forms including, for example, that of a hand-held "air" mouse, hand-held presentation tool (e.g., pointer to advance slides and control graphic content), TV remote control, or head-mounted device (HMD).

The in-air computing accessory includes one or more 3D motion sensors such as an accelerometer 102 or a gyroscope 104. While not all devices implementing the disclosed technology include both a gyroscope and an accelerometer, an in-air computing accessory may typically include at least 3-axes motion sensing instrument. Data collected by the 3D motion sensing instrument(s) may be transmitted to a host device 130 and used to influence motions of a cursor element presented on a display of the computing system 100. For example, wrist velocity data collected by the gyroscope 104 can be used to inform dx/dy movements of a cursor. Likewise, data of the accelerometer 102 can be similarly used to inform dx/dy cursor movements.

Data collected by the 3D motion sensor(s) is provided to various software components such as a movement analyzer 116 and/or a grip analyzer 118 that are stored in memory 106 and that are executed by a microprocessor 112 of the in-air computing accessory 101 to provide various control actions, such as selecting haptic feedback settings that are input to a haptic feedback waveform controller 122. Specifically, the movement analyzer 116 and the grip analyzer 118 may alter settings for gain 124 and/or frequency 126 of a haptic feedback waveform in response to detecting certain motion events, and the haptic feedback waveform controller 122 generates the haptic feedback waveform according to such settings. A signal including the haptic feedback waveform is transmitted to haptic feedback circuitry (IC) 110, which translates the waveform to physical haptic feedback (forces) that are felt by a user making physical contact with the in-air computing accessory 101.

The frequency 126 of the haptic feedback waveform controls the temporal separation between pulses, vibrations, or other haptic sensations felt by the user. In contrast, the gain 124 controls the amplitude of the haptic feedback wave and thus, the strength of the haptic sensations felt by the user. In one implementation, the haptic feedback IC 110 includes one or more piezoelectric actuators that are controllably energized to provide surface vibrations that can be felt by a user and that are proportional to the frequency 126 and gain 124 of a received haptic waveform.

In one implementation, the gain 124 of the haptic feedback waveform is set based at least in part on or more detected parameters including speed, position, acceleration, and user grip characteristics. For instance, the movement analyzer 116 may determine the user's wrist velocity from the data collected by gyroscope 104 and select a higher value for the gain 124 when the velocity is greater than when the velocity is lower so as to provide the user with a faster closed-loop haptic response such that the user can "feel" the cursor speeding up as it moves across the screen, thereby resulting in improved user control and feel.

In another implementation, the movement analyzer 116 selects different values for the gain 124 depending on the primary direction of movement of the in-air computing accessory 101. Since, for example, it may be difficult for a user to perceive how effectively they are "steadying" the accessory on the y-axes while moving it horizontally, a different type of feedback may be provided when movements are predominately along the y-axis than for movements that are predominately along the x-axis, such as by providing strong haptic feedback when the user is moving in the y-direction than in the x-direction (e.g., haptic feedback gain, G, that is proportional to (dx/2)+dy.

In yet still another implementation, the grip analyzer 118 analyzes motion data collected by the gyroscope 104 and/or the accelerometer 102 to infer one or more user grip characteristics indicative of a type of user grip on the handheld computing accessory. Examples of this are discussed below with respect to FIG. 2. If the gain 124 remains constant, a user feels more haptic feedback when gripping the in-air computing accessory 101 at a location that is nearer to the haptic feedback IC 110 than when gripping the in-air computing accessory 101 at a location that is comparatively further away from the haptic feedback IC 110. Likewise, gripping the in-air computing accessory 101 with a full hand (or a greater surface area of skin) may cause a perceived amplification of the haptic sensations. To make the user haptic experience more uniform independent of grip location and grip type, the grip analyzer 118 uses the detected grip characteristics to selectively increase or decrease the gain 124 of the haptic feedback waveform, as discussed further with respect to FIG. 2-3.

In some implementations, the in-air computing accessory 101 further includes a user interface (UI) haptics modifier 134 that modifies the gain 124 and/or the frequency 126 based at least in part on the user's interactions with various UI elements on the display of the computing system 100. For instance, applications executed by the host device 130 may be associated with different haptic feedback settings such that the user's haptic experience differs depending on which application the user is currently interacting with via the in-air computing accessory 101. For instance, different host-executed applications may be associated with different haptic frequencies such that the user feels a first sensation (e.g., a buzz) when interacting with a window of a first application and a different sensation (e.g., a pulse) when interacting with a window of a second different application. This typic of haptic feedback provides the user with a greater sense of control in the sense that they will be immediately informed if the cursor moves out of an application window that the user is currently interacting with.

In still other implementations, the UI haptics modifier 128 modifies the gain 124 and/or frequency 126 of the haptic feedback waveform based at least in part on different characteristics that are determined by the host-executed application that the user is interacting with. For instance, the host operating system or other host-executed application may instruct the UI haptics modifier 128 to provide haptic feedback when the cursor crosses particular boundaries on the user interface, such as boundaries between application windows, boundaries of graphics or other selectable UI elements, or boundaries of the display screen (e.g., such that the haptic feedback provided allows a user to determine, without visually sighting the cursor element, whether or not the cursor element is at an x/y position that is "on-screen" of the display). Further exemplary haptic controls are discussed with respect to the following figures.

Figure 2:
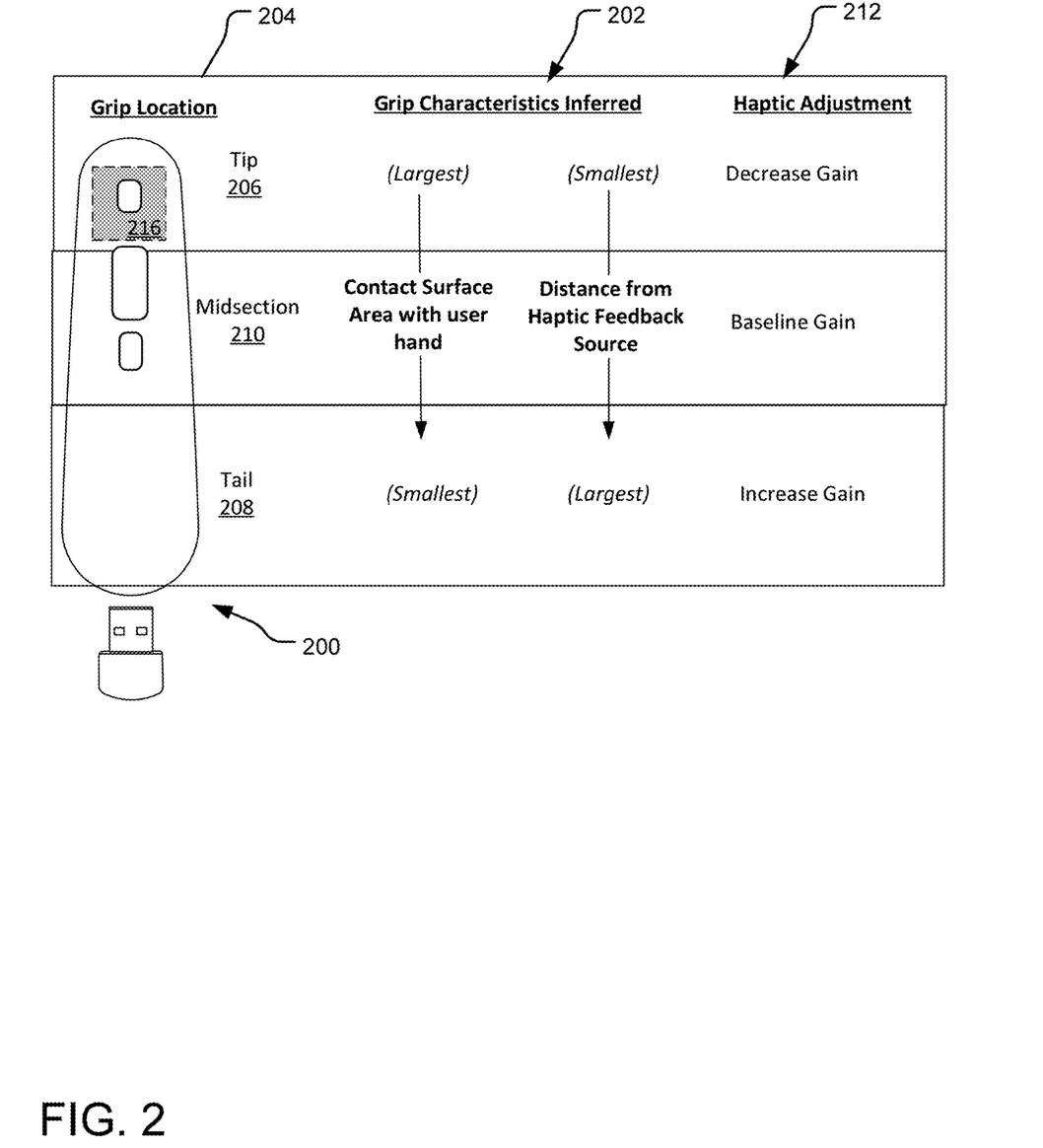
FIG. 2 illustrates an example table illustrating inferable grip characteristics and associated haptic adjustments that may be performed to ensure that an in-air computing accessory delivers a uniform haptic experience to different users.

FIG. 2 illustrates an example table 204 illustrating inferable grip characteristics 202 and associated haptic adjustments 212 that may be performed to ensure that an in-air computing accessory 200 delivers a haptic experience that is perceived identically despite variabilities in how different users may grip the in-air computing accessory 200.

According to one implementation, the in-air computing accessory 200 locally executes grip analysis software (e.g., the grip analyzer 118 of FIG. 1) that analyzes sensor inputs to infer characteristic(s) of a user grip on the handheld computing accessory. Inferable characteristics of user grip include grip location (e.g., device tip, middle, or tail) and/or grip type (e.g., full hand/palm, fingertip grip). In various implementations, some of the below-described aspects of the grip analyzer tool are executed remotely, such as by a host device (not shown) or cloud-based server in communication with haptic control circuitry within the in-air computing accessory 200. In one implementation, the grip analysis software modifies amplitude (gain) of a haptic feedback waveform based at least in part on the inferred grip characteristics in order to selectively increase or decrease the 'strength' of haptic feedback sensations perceived by a user such. For example, the amplitude of the haptic feedback waveform may be selectively adjusted in ways that create a more uniform haptic experience across different users that individually grip the in-air computing accessory 200 in different ways.

One characteristic of user grip that can impact the perception and sensation of haptic feedback is grip location—e.g., the physical location on the hand-held accessory where the user is making physical contact with their hand or fingers. Notably, different users may routinely grip the in-air computing accessory in different ways such as near the tip, middle, or tail of the accessory. As used herein, a device "tip" refers to an end of the device that is most proximal to a display on which a corresponding cursor is graphically rendered when the device is in normal use. Likewise, "middle" refers to a mid-section of the device and "tail" refers to an opposite end of the device that is most distal to the display when the device is in normal use.

Grip location can, in some cases, be used to infer the relative surface area of contact between the user and the in-air computing accessory 200. When, for example, the user is gripping the in-air computing accessory 200 near the tip, it may be true that a greater portion of the user's hand may be in contact with the hand-held accessory than when the user's grip is focused closer to the tail end of the in-air computing accessory 200.

The ability to infer the relative surface area of contact between the user and the in-air computing accessory 200 is useful because the surface area of user skin contact with a haptic feedback device is, in general, proportional to the strength of haptic feedback response felt by the user. For example, user gripping a haptic feedback device by the full hand (e.g., with palm in contact with the device) may perceive a stronger haptic response than a user that is using just their fingertips to grip an identical device with identical haptic feedback waveform. To create a more uniform haptic feedback experience, grip analyzer software executed by the in-air computing accessory 200 may infer whether the surface area of contact between the user and the in-air computing accessory 200 is large or small and adjust the haptic feedback waveform amplitude (gain) to be smaller when the surface area of contact is larger than when the surface area of contact is smaller, as reflected in the table 204.

In addition to the size of area of contact between the user and the in-air computing accessory 200, the strength of the haptic feedback perceived by the user may also be impacted by the physical distance between the hardware (haptic feedback IC) creating the haptic feedback sensations and the user's skin. If, for example, the user is gripping the hand-held accessory near the haptic feedback IC that provides the haptic response, the user perceives a stronger haptic sensation than if the user is gripping the hand-held accessory at a location that is comparatively further away from the haptic feedback IC. To create a more uniform haptic feedback experience, the grip analyzer software may determine whether the user grip location is near or far from the haptic feedback IC and adjust haptic feedback waveform amplitude to increase in proportion to the separation between the user's hand and the haptic feedback IC.

In the example of FIG. 2, the in-air computing accessory 200 includes haptic IC 216 in a tip portion 206 of the in-air computing accessory 200. In this example, the user perceives a larger haptic feedback response when gripping the in-air computing accessory 200 near the tip portion 206 than when gripping the in-air computing accessory 200 near a tail portion 208. Accordingly, the grip analyzer tool of the in-air computing accessory 200 selectively sets the haptic feedback gain to a baseline level when the user grip is determined to be at or near a midsection 210 of the in-air computing accessory 200, decreases the gain from the baseline level when the user grip is determined to be at or near the tip portion 206, and increases the gain from the baseline level when the user grip is determined to be at or near the tail portion 208, as shown in table 204. Notably, this trend may differ when the haptic feedback IC is located in middle or end regions.

Figure 3:
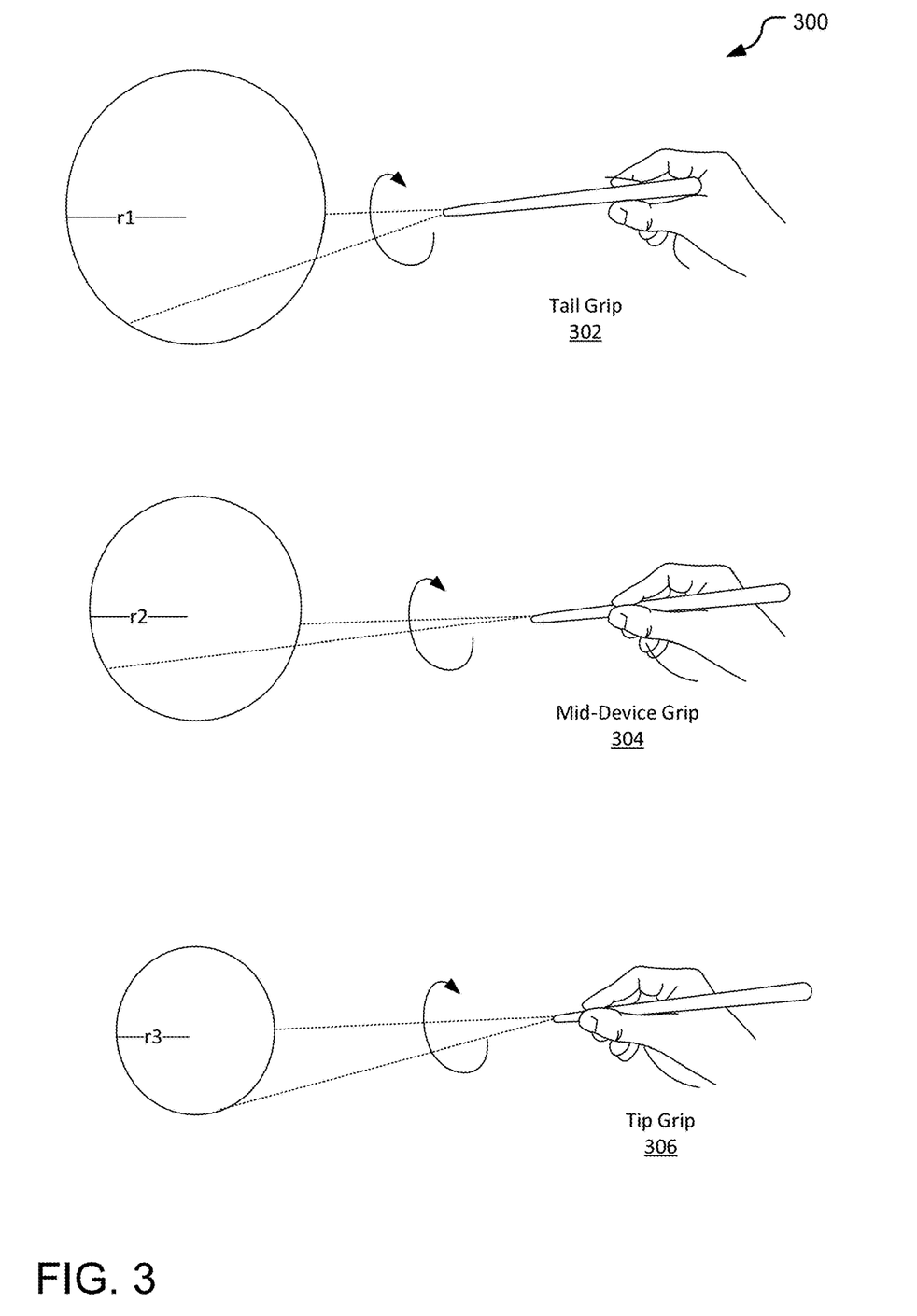
FIG. 3 illustrates example instances of a calibration technique that may allow an in-air accessory to infer grip characteristics from 3D movement data that is collected by one or more 3D motion sensors of an in-air computing accessory.

In different implementations, the in-air computing accessory 200 may use different techniques to infer the grip characteristics 202 (e.g., grip location and grip type). In one implementation, the in-air computing accessory 200 includes proximity sensors, such as sensors that employ capacitive sensing to identify regions of the in-air computing accessory 200 that are in closest proximity with the user's hand. FIG. 3 explores an alternative to the proximity sensing approach by instead utilizing wrist velocity data to indirectly infer the grip characteristics 202. The approach of FIG. 3 may be preferred by some product design teams because it may facilitate the exclusion of proximity-sensing hardware and thereby reduce production costs.

FIG. 3 illustrates example instances 300, 302, 304 of a calibration technique that may allow an in-air accessory to infer grip characteristics from 3D movement data that is collected by one or more 3D motion sensors of an in-air computing accessory. According to one implementation, the example calibration technique provides for prompting a user to draw an in-air shape, such as a circle, while holding the in-air computing accessory in the air. For example, the in-air computing accessory may transmit a command to a system host that causes the host to present a prompt asking the user to draw the-in air shape. Although the disclosed technique may work well with different in-air shapes, the example instances 300, 302, 304 correspond to a scenario where the user is prompted to draw a circle. While the calibration technique of FIG. 3 may utilize other in-air shapes, a circle may prove to be the most useful because the circle is drawn with movement that is about a single axis (e.g., the wrist joint); consequently, the size of the circle is in no way influenced sharp side-to-side or up and down motions that have less of a correlation with user grip location and that may vary in length with respect to different sides of a same shape or across different users drawing different shapes.

Characteristics of the in-air shape drawn by the user may be extracted by analyzing movement data. In one implementation, the in-air computing accessory includes a 3-axes gyroscope. Wrist velocity data is collected by the gyroscope and integrated to derive x/y coordinates of the shape. In another implementation, the in-air computing accessory includes a 3-axes accelerometer and the x/y coordinates of the shape are extracted by twice integrating the accelerometer data.

In each of the example instances 300, 302, 304, the user is gripping the in-air computing device accessory slightly differently. As shown, these differences in grip tend to correlate with differences in the size of the in-air shape. In the example instance 302, the user is gripping the in-air computing accessory 200 at a location close to a tail end of the accessory and the resulting in-air shape has a radius r1 that is larger than the radius of the in-air shapes resulting in the example instances 304 and 306. In the example instance 304, the user is gripping the in-air computing accessory at a location centered within a midsection of the accessory and the resulting in-air shape has a radius r2, that is less than r1. In the example instance 306, the user is gripping the in-air computing accessory 200 at a location close to a tip end of the accessory and the resulting in-air shape has a radius r3 that is smaller than r2.

According to one implementation, the radius of the in-air shape (r1, r2, or r3) is extracted by a grip analysis tool executed by the in-air computing device accessory or another device that receives the gyroscope and/or accelerometer data from the in-air computing accessory. The grip analysis tool queries a prepopulated look-up table (not shown) with the determined radius of the shape to retrieve a corresponding grip characteristic such as grip location or relative contact area between the user's hand and the in-air computing device accessory.

In one implementation, the grip analysis tool first determines whether the determined radius is within a defined range that is associated with "wrist movement." If, for example, the user draws the shape while keeping their wrist stationary (locked) but while rotating the forearm about the elbow joint, a very large shape may result. Thus, a particularly large radius may indicate that movement is "about the elbow," in which case it may not be possible to infer grip characteristics without further information. In one implementation, the look-up table returns an "out of range" error when the radius is larger than the range expected from normal wrist movement. In this case, the grip analysis tool may select default values for haptic feedback parameters.

Provided the measured radius (e.g., r1, r2, or r3) is within a predefined expected range, the grip analysis tool may identify, from the look-up table, a corresponding grip location (e.g., tip, midsection, or tail) that is associated with a range of radii corresponding to the measured value. In general, a smallest range of radii may be associated with user grip near the device tip, as gripping the device near the tip typically results in the smallest in-air shape. A larger range of radii may be associated with user grip near the device mid-point, as gripping the device at or near the midsection typically results in a larger in-air shape than holding the device near the tip. A largest range of radii may be associated with user grip near the device tail, as gripping the device near the tail typically results in an in-air shape that is larger than in the former two scenarios.

Based at least in part on the determined grip location, the grip analysis tool may alter a gain value for the haptic feedback, such as according to the trend illustrated and discussed with respect to FIG. 2 (e.g., gain increasing in proportion to grip distance away from the haptic feedback IC and/or in proportion to user contact area, where a large contact area is associated with tip grip and a smallest contact area is associated with tail grip).

Figure 4:
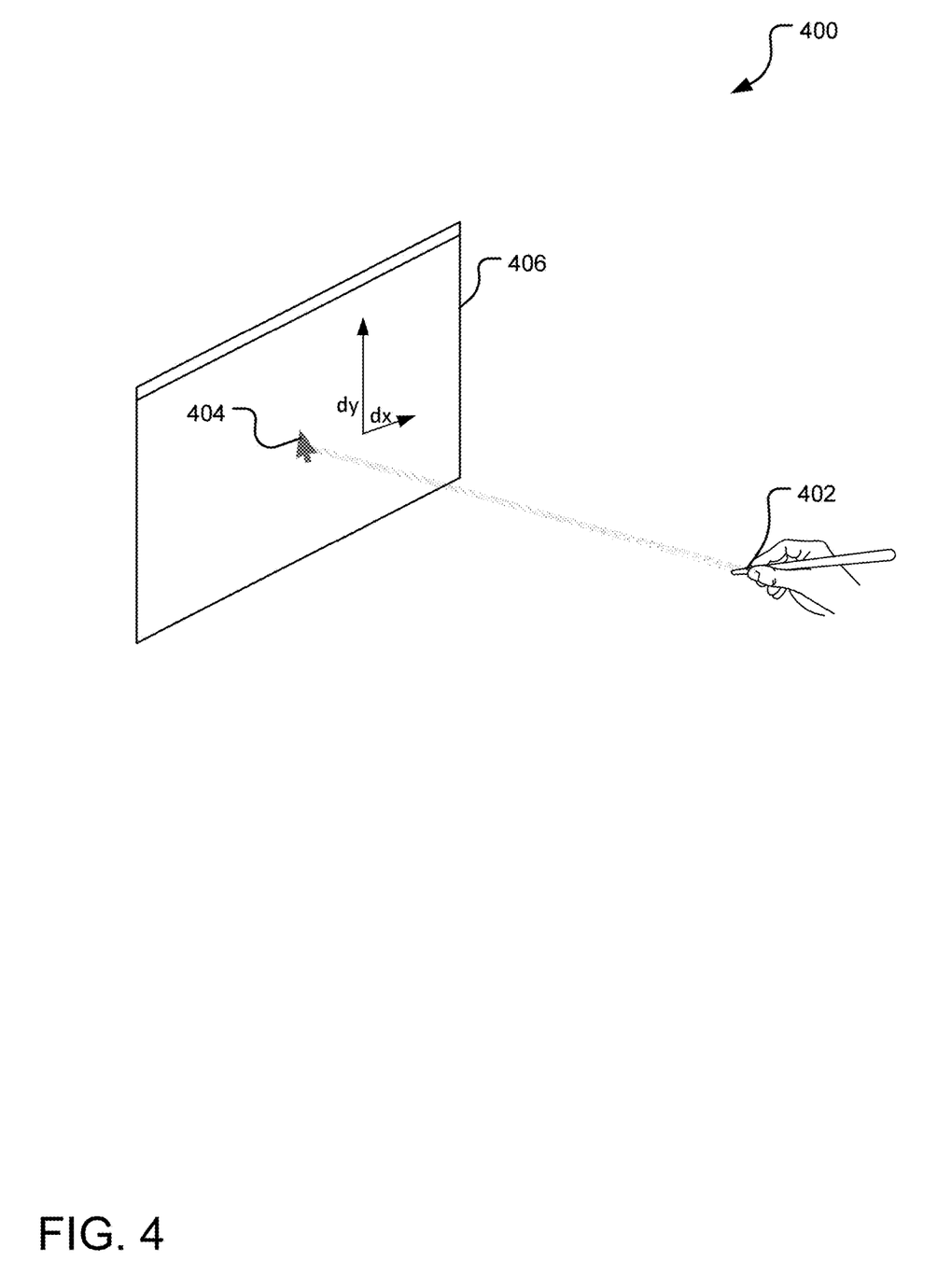
FIG. 4 illustrates additional features of an example system including an in-air computing accessory that uses 3D motion-sense data to provide haptic feedback that informs the user experience.

FIG. 4 illustrates additional features of an example system 400 including an in-air computing accessory 402 that uses 3D motion-sense data to provide haptic feedback that informs the user experience. According to one implementation, the in-air computing accessory 402 provides ongoing or continuous haptic feedback (e.g., a soft buzz or pulse) as the user moves the in-air computing accessory 402 to affect motions of a cursor 404 on a display 406. Parameters of the haptic feedback waveform are controllably varied in response to (or as a function of) detected motion events.

In one implementation, the gain of the haptic feedback waveform is controllably varied as a function of the direction of motion of the in-air computing accessory 402 in order to improve the user's sense of position control and to distinguish between up/down and left/right motions. For example, the haptic feedback gain (waveform amplitude) may be increased when the user is moving in the y-direction (up/down) as compared to the x-direction (left/right) or vice versa. In one implementation, the haptic feedback gain is computing according to a function that provides stronger gain when movement is along one axis than the other axis. For example, the haptic feedback gain may vary as a function of (dx/2+dy) or other like relationship with varied x/y response.

In still another implementation, the haptic feedback gain of the in-air computing accessory 402 is controllably varied as a function of detected velocity, with gain being increased in proportion to the magnitude of the detected velocity. This allows the user to essentially "feel" the speed as opposed to merely gauging speed by watching the direction of cursor movement on the display 406.

In still yet another implementation, the haptic feedback gain of the in-air computing accessory 402 is additionally or alternatively computed as a function of detected acceleration, with gain being increased in proportion to the magnitude of the detected acceleration. This allows the user to immediately feel that they have accelerated the movement as opposed to merely perceiving acceleration by watching the cursor movement on the display 406.

In some devices, the aspects of position detection are divided between software executed in the in-air computing accessory 402 and a host device (e.g., a host device controlling the display 406). For example, preliminary dx/dy movement data may be determined by the in-air computing accessory 402 and the detected dx/dy values may be refined by way of post-processing performed by an operating system of the host device, such as by further extrapolating between sample points to make movements of the cursor 404 look smoother. In one implementation, the calculation of haptic feedback gain is based at least in part on the final movement data (e.g., velocity data, acceleration data, and/or position data) that is generated during the post-processing performed by the host device. Consequently, the haptic feedback generated more accurately matches the movements that the user "sees" on the display 406, an effect that reduces the disconnect that might otherwise be felt if haptic feedback were generated based at least in part on the initially-determined movement data rather than the movement data processed by the host operating system.

In still yet another implementation that may be separate from or inclusive of any of features of any of the above-described implementations, haptic feedback gain is function of different types of movement data and/or the detected grip characteristics. For example, the haptic feedback gain may be a function that depends on one or more of speed, acceleration, grip and/or direction, such as according to the relation shown by equation (1) below, where G is the haptic feedback gain:

$$G = f(\text{speed}, \text{acceleration}, \text{direction}, \text{and grip}) \quad (1)$$

In one implementation where gain of the haptic feedback waveform is given by equation (1), the "speed" and "acceleration" terms increase in proportion to the magnitude of detected speed and acceleration, and the "direction" term creates a directionally varied gain response (e.g., such as dx/2+dy, as in the above example). Likewise, the "grip" term in equation (1) may be a term that either increases in proportion to distance between the grip location and the haptic feedback IC and/or that increases in inverse proportion to the amount of contact surface area between the user and the in-air computing accessory 402 such that the grip term increases when there exists a smaller surface area of contact with the user's skin, as discussed with respect to FIG. 2.

In still other implementations, the gain of the haptic feedback waveform may be defined by a relationship different than that of equation (1), such as based on fewer than all parameters shown or based on parameters defined in addition to or in lieu of those shown.

The examples discussed above with respect to FIG. 4 all generally relate to movement haptics, where the haptic response depends upon the movement of the in-air computing accessory 402. Some implementations of the device may further implement UI haptics, where the haptic response depends upon the user's interaction with various UI elements on the display 406. For instance, applications executing on the host device may provide for certain haptic responses (adjustments to the haptic waveform gain and/or frequency) when the in-air computing accessory 402 hovers over or clicks on a button, crosses an application window boundary, and/or when the cursor element crosses outer x/y boundaries of the display 406. In one implementation, movement haptics are prioritized over UI haptics such that movement haptics are felt as the default and occasionally interrupted by UI haptics as the in-air computing accessory 402 interacts with UI elements.

Figure 5:
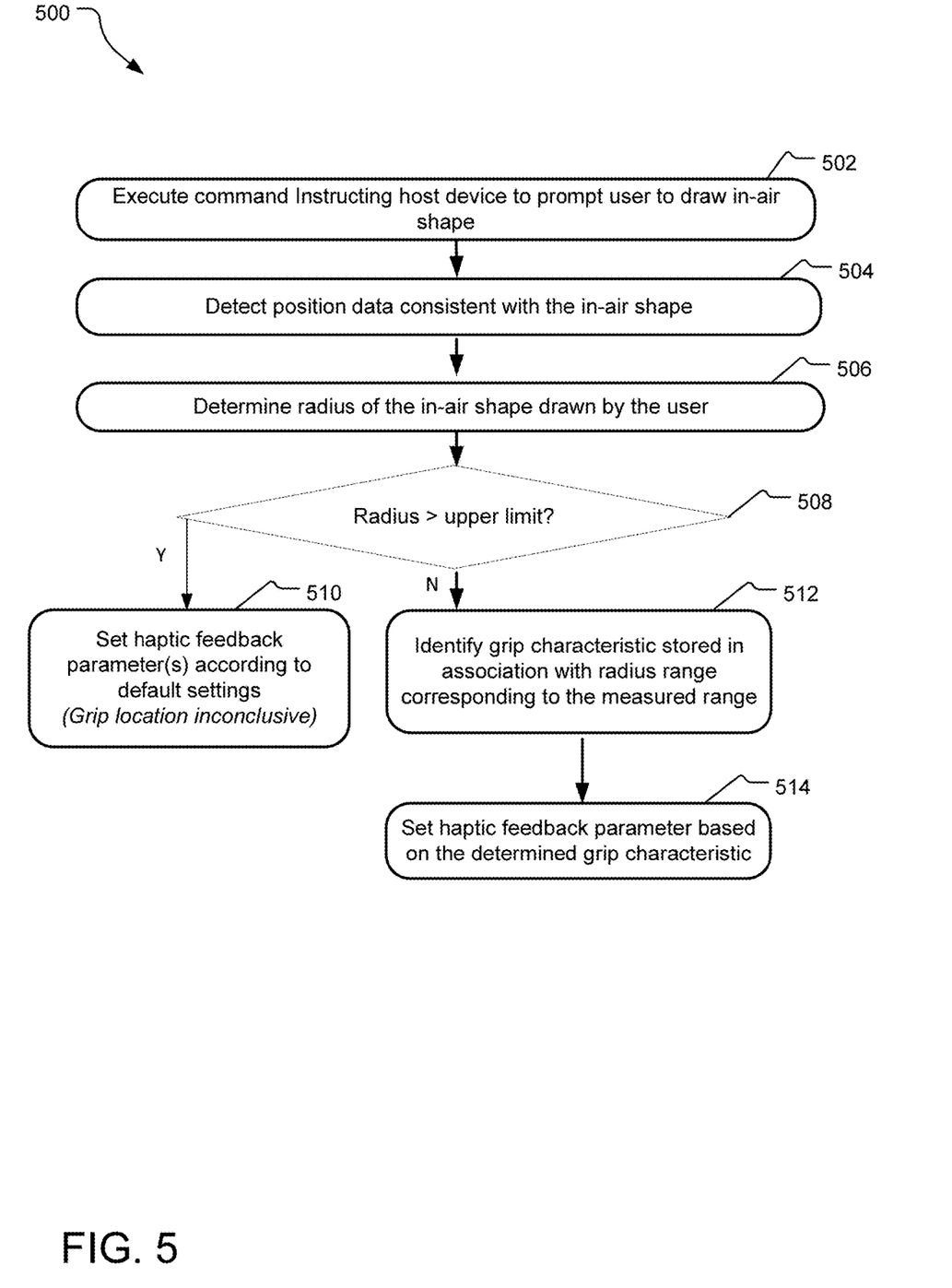
FIG. 5 illustrates example operations for adjusting gain of a haptic feedback waveform based at least in part on one or more grip characteristics detected for an in-air computing accessory.

FIG. 5 illustrates example operations 500 for adjusting gain of a haptic feedback waveform based at least in part on one or more grip characteristics detected for an in-air hand-held computing accessory. The operations 500 correspond, at least in part, to system features and characteristics described with respect to FIG. 2-3.

A command operation 502 executes a command that instructs a host device to prompt a user to drawn an in-air shape with the hand-held accessory. For example, the host device may prompt the user, through a display, to draw a circle while pointing the in-air hand-held computing accessory at the display.

A detection operation 504 detects movement data consistent with the in-air shape. For example, movement data is collected by one or more 3D motion sensors on-board the in-air hand-held computing accessory, such as by one or more gyroscopes and/or accelerometers. Wrist velocity data collected by a gyroscope may be once integrated to provide cursor x/y position data; likewise, accelerometer data can be twice integrated to provide position data the cursor x/y position data. The detection operation 504 may employ pattern matching techniques to determine whether the cursor x/y position data is consistent with the in-air shape (e.g., to determine if the user has, in fact, drawn a circle in response to the prompt asking the user to draw a circle).

A determination operation 506 uses the cursor x/y position data to determine a radius of the in-air shape drawn by the user. A determination operation 508 determines whether the radius is greater than a predefined upper limit. If so, the grip location and contact area are deemed "inconclusive," as may be the case when the user's movement is about the elbow joint rather than the wrist. In this case, a haptic feedback parameter adjustment operation 510 selects a haptic feedback response (e.g., gain or frequency) based at least in part on a default grip setting which may be either a developer-selected setting or a user-adjustable setting, such as a setting associated with a user profile.

If the determination operation 508 determines that the measured radius is not greater than the upper limit, and identification operation 512 identifies a grip characteristic stored in association with a radius range encompassing the measured radius. In one implementation, the grip characteristic indicates a relative location of the user grip on the in-air computing accessory and/or a relative area of surface contact that the user is making with the in-air computing accessory. For example, the radius of the in-air shape may tend to increase in proportion to the distance between the user grip location and the tip of the in-air hand-held computing accessory. Likewise, a greater contact surface area may in some cases be presumed when the user is holding the in-air hand-held computing accessory closer to the tip. Ranges of radii corresponding to each of multiple different grip locations and/or areas of surface contact may be determined through factory calibration designed to suite a large pool of users, such as collecting large dataset and/or in some cases, by employing machine learning tactics on large datasets.

After the grip characteristic is identified by the identification operation 512, a haptic feedback adjustment operation sets a haptic feedback parameter based at least in part on the identified grip characteristic. For example, haptic feedback gain may be set to provide a response that increases in strength in proportion to a distance between an identified grip location and haptic feedback IC and/or in inverse proportion to an amount of contact surface area between the user's hand and the in-air computing accessory. Select gain values to be used in association with each different grip characteristics are, in one implementation, predetermined and stored in a lookup table that is accessed when the grip characteristic is detected.

Figure 6:
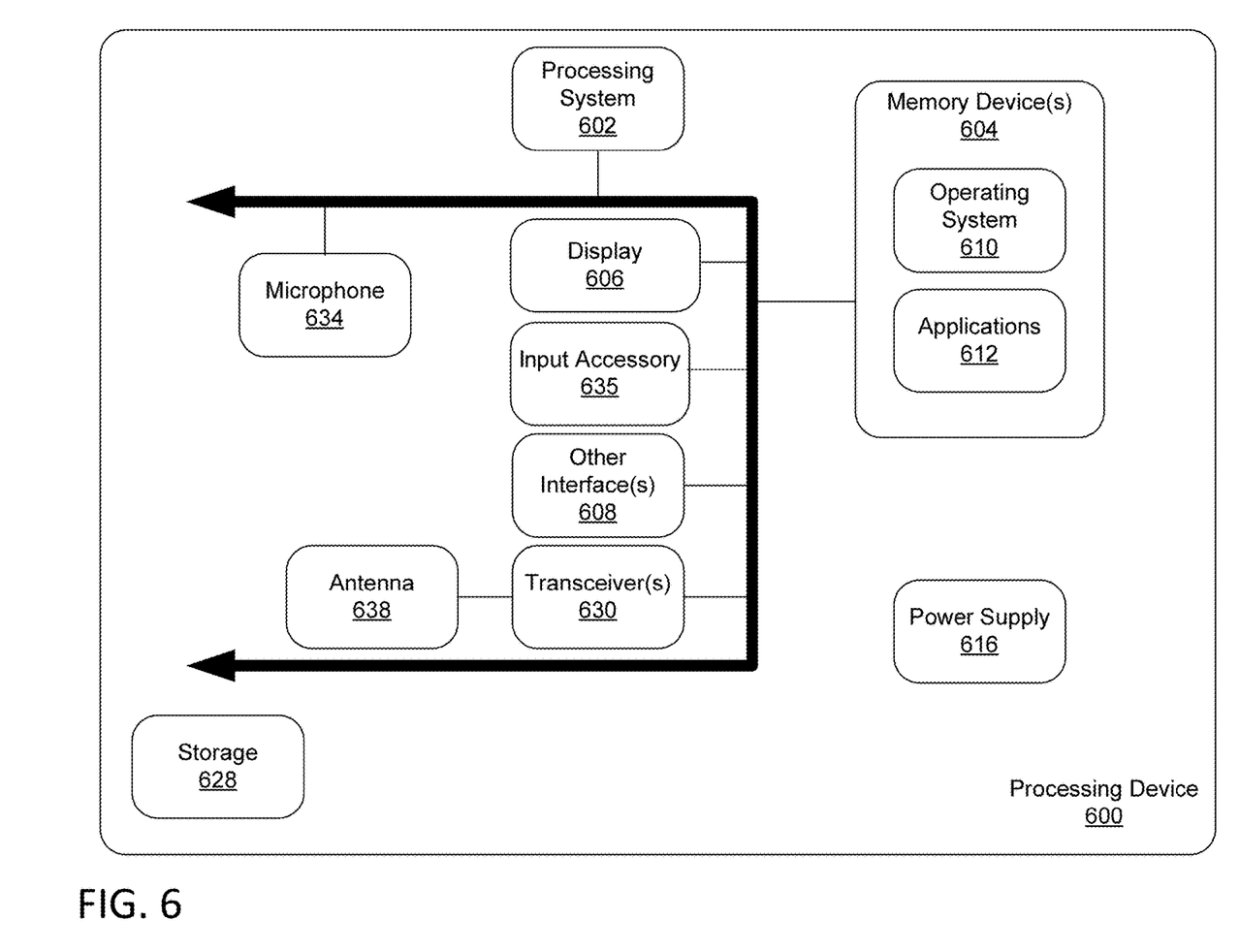
FIG. 6 illustrates an example schematic of a processing device suitable for implementing aspects of the disclosed technology.

FIG. 6 illustrates an example schematic of a processing device 600 suitable for implementing aspects of the disclosed technology. In one implementation, the processing device 600 is a host device that renders data to a display 606 and that controls certain UI elements (e.g., a cursor) on the display based at least in part on inputs received from an in-air computing accessory (e.g., the in-air computing accessory 101 of FIG. 1).

The processing device 600 includes a processing system 602, memory 604, the display 606, and other interfaces 608 (e.g., buttons). The memory 604 generally includes both volatile memory (e.g., RAM) and non-volatile memory (e.g., flash memory). An operating system 610 may reside in the memory 604 and be executed by the processing system 602. One or more applications 612, such as aspects of the haptic feedback waveform controller 122 of FIG. 1, the grip analyzer 118 of FIG. 1, the movement analyzer 116 of FIG. 1, the UI haptics modifier 128 of FIG. 1 or other applications that control graphically-rendered content in response to inputs from the in-air computing accessory may loaded in the memory 604 and executed on the operating system 610 by the processing system 602.

The processing device 600 includes a power supply 616, which is powered by one or more batteries or other power sources and which provides power to other components of the processing device 600. The power supply 616 may also be connected to an external power source that overrides or recharges the built-in batteries or other power sources.

The processing device 600 includes one or more communication transceivers 630 and an antenna 632 to provide network connectivity (e.g., a mobile phone network, Wi-Fi®, BlueTooth®). The processing device 600 may also include various other components, such as a positioning system (e.g., a global positioning satellite transceiver), one or more accelerometers, one or more cameras, an audio interface (e.g., a microphone 634, an audio amplifier and speaker and/or audio jack), and storage devices 628. Other configurations may also be employed. In an example implementation, a mobile operating system, various applications and other modules and services may be embodied by instructions stored in memory 604 and/or storage devices 628 and processed by the processing system 602. The memory 604 may be memory of host device or of an accessory that couples to a host.

The processing device 600 may include a variety of tangible computer-readable storage media and intangible computer-readable communication signals. Tangible computer-readable storage can be embodied by any available media that can be accessed by the processing device 600 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing device 600. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

(A1) According to one implementation, a method disclosed herein provides for collecting sensor data at a handheld computing accessory; analyzing the collected sensor data to infer a grip characteristic indicating an aspect of a user grip on the handheld computing accessory; selecting an amplitude for a haptic feedback waveform based on the inferred grip characteristic; and generating, at the handheld computing accessory, haptic feedback according to the selected amplitude. The method of A1 is advantageous because it allows haptic feedback parameters to be adjusted based on detected aspects of user grip to ensure that the haptic feedback experience is uniform across different users despite differences in how various users may grip the handheld computing accessory.

(A2) In some implementations of A1, the collected sensor data includes at least one of accelerometer data and gyroscope data.

(A3) In still other implementations of A1 or A2, analyzing the collected sensor data to infer a grip characteristic further comprises determining position data corresponding to an in-air shape drawn by the handheld computing device accessory; determining a radius of the in-air shape; and identifying the grip characteristic based on the determined radius of the in-air shape.

(A4) In some implementations of A1, A2, or A3, a larger radius of the in-air shape is indicative of a grip that is closer to a tail end of the handheld computing accessory and a smaller radius of the in-air shape is indicative of a grip that is closer to a tip end of the handheld compute accessory.

The methods of A2-A4 are beneficial because they allow for determining aspects of a user grip without relying on proximity sensing hardware; thus, the handheld computing accessory may be potentially manufactured at lower cost due to the absence of proximity sensing hardware.

(A5) In some implementations of A1-A5, the amplitude of the haptic feedback waveform increases in proportion to distance between an identified grip location and a location of haptic feedback integrated circuitry (IC) within the handheld computing accessory.

(A6) In some implementations of A1-A6, the amplitude of the haptic feedback waveform increases in inverse proportion to a size of surface area contact between a user's hand and the handheld computing accessory.

The methods of A5 and A6 are beneficial because they provide for adjusting the haptic feedback waveform such that the haptic sensations felt by the user are uniform regardless of grip location or the size of the contact area between the user's hand and the handheld computing accessory.

(A7) In some implementations of A1-A6, the amplitude of the haptic feedback waveform is further selected as a function of at least one of speed of the handheld computing accessory, acceleration of the handheld computing accessory, and direction of movement for the handheld computing accessory.

(A8) In other implementations of A1-A7, the amplitude of the haptic feedback waveform is further based on a direction of movement of the handheld computing accessory, wherein movements in a first direction influence the amplitude by a greater amount than movements in a second different direction.

(A9) In some implementations of A1-A8, the amplitude of the haptic feedback waveform is selectively increased in proportion to a magnitude of acceleration.

(A10) In other implementations of A1-A9, the amplitude of the haptic feedback waveform is selectively increased in proportion to detected velocity.

The methods of A7-A10 are beneficial because they may provide the user with a greater sense of control over movements of an on-display cursor element by allowing the user to feel aspects of velocity, acceleration, and direction as opposed to just watching the cursor element move in response to the user's movements of the handheld computing accessory.

In another aspect, some implementations include in-air computing accessory that provides haptic feedback. The in-air computing accessory includes hardware logic circuitry that is configured to perform any of the methods described herein (e.g., methods A1-A10).

In yet still another aspect, some implementations include a computer-readable storage medium for storing computer-readable instructions. The computer-readable instructions, when executed by one or more hardware processors, perform any of the methods described herein (e.g., methods A1-A10).

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A method comprising:
    collecting 3D motion sensor data at a handheld computing accessory;
    analyzing the collected 3D motion sensor data to infer a grip location of a user's hand on the handheld compute accessory;
    selecting an amplitude for a haptic feedback waveform based at least in part on the inferred grip location; and
    generating, at the handheld computing accessory, haptic feedback according to the selected amplitude.

2. The method of claim 1, wherein the collected sensor data includes at least one of accelerometer data and gyroscope data.

3. The method of claim 1, wherein analyzing the collected sensor data to infer the grip location further comprises:
    determining position data corresponding to an in-air shape drawn by the handheld computing accessory;
    determining a radius of the in-air shape; and
    identifying the grip location based at least in part on the determined radius of the in-air shape.

4. The method of claim 3, wherein a larger radius of the in-air shape is indicative of a grip that is closer to a tail end of the handheld computing accessory and a smaller radius of the in-air shape is indicative of a grip that is closer to a tip end of the handheld compute accessory.

5. The method of claim 4, wherein the amplitude of the haptic feedback waveform increases in proportion to distance between an identified grip location and a location of haptic feedback integrated circuitry (IC) within the handheld computing accessory.

6. The method of claim 4, wherein the amplitude of the haptic feedback waveform increases in inverse proportion to a size of surface area contact between a user's hand and the handheld computing accessory.

7. The method of claim 1, wherein the amplitude of the haptic feedback waveform is further selected as a function of at least one of speed of the handheld computing accessory, acceleration of the handheld computing accessory, and direction of movement for the handheld computing accessory.

8. The method of claim 7, wherein the amplitude of the haptic feedback waveform is further based at least on part on a direction of movement of the handheld computing accessory, and wherein movements in a first direction influence the amplitude by a greater amount than movements in a second different direction.

9. The method of claim 7, wherein the amplitude of the haptic feedback waveform is selectively increased in proportion to a magnitude of acceleration.

10. The method of claim 7, wherein the amplitude of the haptic feedback waveform is selectively increased in proportion to detected velocity.

11. An in-air computing accessory comprising:
    one or more 3D motion sensors that collect 3D motion data for the in-air computing accessory;
    a grip analyzer stored in memory that:
        analyzes the collected 3D motion data to infer a grip location of a user's hand on the in-air computing accessory and that selects an amplitude for a haptic feedback waveform based at least in part on the inferred grip location; and
    a haptic feedback waveform controller stored in memory that generates, at the in-air computing accessory, haptic feedback according to the selected amplitude.

12. The in-air computing accessory of claim 11, wherein the one or more 3D motion sensors include an accelerometer or a gyroscope.

13. The in-air computing accessory of claim 11, wherein the grip analyzer is further configured to:
    determine position data corresponding to an in-air shape drawn by the in-air computing accessory;
    determine a radius of the in-air shape; and
    identify the grip location based at least in part on the determined radius of the in-air shape.

14. The in-air computing accessory of claim 13, wherein a larger radius of the in-air shape is indicative of a grip that is closer to a tail end of the in-air computing accessory and a smaller radius of the in-air shape is indicative of a grip that is closer to a tip end of the in-air computing accessory.

15. The in-air computing accessory of claim 11, wherein the grip analyzer increases the amplitude of the haptic feedback waveform in proportion to distance between an identified grip location and a location of haptic feedback integrated circuitry (IC) within the in-air computing accessory.

16. The in-air computing accessory of claim 11, wherein the grip analyzer increases the amplitude the haptic feedback waveform in inverse proportion to a size of surface area contact between a user's hand and the in-air computing accessory.

17. The in-air computing accessory of claim 11, wherein the in-air computing accessory includes a movement analyzer stored in memory that further adjusts the amplitude of the haptic feedback waveform as a function of at least one of speed of the in-air computing accessory, acceleration of the in-air computing accessory, and direction of movement for the in-air computing accessory.

18. The in-air computing accessory of claim 17, wherein the movement analyzer adjusts the amplitude of the haptic feedback waveform based at least in part on a direction of movement of the in-air computing accessory such that movements in a first direction influence the amplitude by a greater amount than movements in a second different direction.

19. The in-air computing accessory of claim 17, wherein the movement analyzer selectively increases the amplitude of the haptic feedback waveform in proportion to at least one of acceleration and velocity.

20. One or more tangible computer-readable storage media encoding computer-executable instructions for executing a computer process, the computer process comprising:

collecting 3D motion data at an in-air handheld computing accessory;

analyzing the collected 3D motion data to infer a grip location of a user's hand on the handheld computing accessory;

selecting an amplitude for a haptic feedback waveform based at least in part on the inferred grip location; and generating, at the in-air handheld computing accessory, haptic feedback based at least in part on the selected amplitude.

21. The method of claim 1, wherein the amplitude for the haptic feedback waveform is selected to increase in proportion to distance between the haptic feedback source and the grip location.

22. The method of claim 1, wherein the haptic feedback waveform is selected to increase in proportion to a size of a contact surface area between the user's hand and the handheld computing accessory, the size of the contact surface area being inferred based at least in part on the grip location.

* * * * *

UNITED STATES PATENT AND TRADEMARK OFFICE
CERTIFICATE OF CORRECTION

| | | |
|---|---|---|
| PATENT NO. | : 11,775,071 B1 | Page 1 of 1 |
| APPLICATION NO. | : 17/689114 | |
| DATED | : October 3, 2023 | |
| INVENTOR(S) | : Shoham Dekel et al. | |

It is certified that error appears in the above-identified patent and that said Letters Patent is hereby corrected as shown below:

On the Title Page

Item [86], insert Prior Publication Data Publication No.:
--US 2023/0288988 A1--
Publication Date:
--September 14, 2023--

Signed and Sealed this
Seventeenth Day of September, 2024

Katherine Kelly Vidal
*Director of the United States Patent and Trademark Office*